(12) United States Patent
Okada et al.

(10) Patent No.: US 7,008,987 B2
(45) Date of Patent: *Mar. 7, 2006

(54) AQUEOUS DISPERSION TYPE PRESSURE-SENSITIVE ADHESIVE COMPOSITION, PRESSURE-SENSITIVE ADHESIVE SHEET, AND PRESSURE-SENSITIVE ADHESIVE RUBBER FOAM SHEET USING THE SHEET

(75) Inventors: Kenichi Okada, Ibaraki (JP); Tomonari Naito, Ibaraki (JP); Michio Umeda, Ibaraki (JP)

(73) Assignee: Nitto Denko Corporation, Osaka (JP)

( * ) Notice: Subject to any disclaimer, the term of this patent is extended or adjusted under 35 U.S.C. 154(b) by 0 days.

This patent is subject to a terminal disclaimer.

(21) Appl. No.: 10/457,447

(22) Filed: Jun. 10, 2003

(65) Prior Publication Data

US 2004/0254276 A1   Dec. 16, 2004

(51) Int. Cl.
*C08K 5/54*   (2006.01)
(52) U.S. Cl. .................. 524/261; 524/267; 524/268; 524/269; 524/272; 524/508
(58) Field of Classification Search ............. 524/272, 524/508, 261, 267, 268, 269
See application file for complete search history.

(56) References Cited

U.S. PATENT DOCUMENTS

| | | | |
|---|---|---|---|
| 4,716,194 A | | 12/1987 | Walker et al. |
| 5,128,386 A | * | 7/1992 | Rehmer et al. .............. 522/35 |
| 5,695,837 A | * | 12/1997 | Everaerts et al. .......... 428/40.1 |
| 6,388,006 B1 | * | 5/2002 | Fujita et al. ................ 524/862 |

FOREIGN PATENT DOCUMENTS

| | | |
|---|---|---|
| JP | 2001-131511 A | 5/2001 |
| JP | 2002-317165 A | 10/2002 |

OTHER PUBLICATIONS

XP-002260351—Derwent abstract of JP 05/230428 (Sep. 7, 1993).
XP-002260352—Derwent abstract of JP 10/183083 (Jul. 7, 1998).
XP-002260353—Derwent abstract of JP 2001/131511 (May 15, 2001).
Eureopan Search Report dated Nov. 20, 2003.

* cited by examiner

*Primary Examiner*—Bernard Lipman
(74) *Attorney, Agent, or Firm*—Sughrue Mion, PLLC

(57) ABSTRACT

An aqueous dispersion type pressure-sensitive adhesive composition which is excellent in adhesion to foams and unsusceptibility to edge peeling and retains stable adhesive force over long, a pressure-sensitive adhesive sheet including a substrate and, disposed on one or both sides thereof, a pressure-sensitive adhesive layer comprising the aqueous dispersion type pressure-sensitive adhesive composition, and a pressure-sensitive adhesive rubber foam sheet comprising a rubber foam and, disposed on one or both sides thereof, the pressure-sensitive adhesive layer or pressure-sensitive adhesive sheet. The aqueous dispersion type pressure-sensitive adhesive composition comprises an aqueous dispersion of a polymer obtained by copolymerizing a monomer mixture comprising one or more alkyl (meth) acrylates as the main component and at least one silane monomer, and a tackifier having a phenolic skeleton, added to the aqueous dispersion.

9 Claims, 3 Drawing Sheets

AQUEOUS DISPERSION TYPE PRESSURE-SENSITIVE ADHESIVE COMPOSITION, PRESSURE-SENSITIVE ADHESIVE SHEET, AND PRESSURE-SENSITIVE ADHESIVE RUBBER FOAM SHEET USING THE SHEET

FIELD OF THE INVENTION

The present invention relates to an aqueous dispersion type pressure-sensitive adhesive composition and a pressure-sensitive adhesive sheet (in the form of a tape, sheet, film, etc.) comprising a substrate and disposed thereon a pressure-sensitive adhesive layer formed from the composition. The invention further relates to a pressure-sensitive adhesive rubber foam sheet comprising a rubber foam and the pressure-sensitive adhesive layer or pressure-sensitive adhesive sheet disposed on one or each side of the foam.

DESCRIPTION OF THE RELATED ART

Rubber foams have hitherto been used extensively as sealing materials for gap filling in various industrial products such as, e.g., buildings and constructions, electrical appliances, residential facilities and equipment, and members of ships, vehicles, motor vehicles, and the like for the purposes of dust protection, heat insulation, sound insulation, vibration isolation, cushioning, waterproofing, airproofing, etc. Recently, rubber foams have come to be extensively used also in the field of information appliances such as personal computers, cellullar phones, and PDAs.

Such rubber foams are obtained by compounding a rubbery polymer excellent in weatherability, cold resistance, heat resistance, chemical resistance, and other properties, such as EPDM (ethylene/propylene/diene rubber), with a vulcanizing agent and a blowing agent and vulcanizing and foaming the resultant composition. They have a pressure-sensitive adhesive layer formed thereon for facilitating application.

The pressure-sensitive adhesive compositions heretofore in use in this application have mainly been solvent-based pressure-sensitive adhesive compositions prepared by dissolving an acrylic or rubbery polymer in an organic solvent. However, shifting to solvent-free types is desired from the standpoints of recent environmental problems and hygienic problems concerning working atmospheres.

Pressure-sensitive adhesive sheets obtained using an aqueous dispersion type pressure-sensitive adhesive composition, which is one kind of solvent-free pressure-sensitive adhesive composition, have advantages, for example, that they are desirable from the standpoint of environmental health because of the nonuse of an organic solvent and are superior also in solvent resistance. However, such pressure-sensitive adhesive sheets obtained with an aqueous dispersion type pressure-sensitive adhesive composition have had a drawback that it is difficult to reconcile adhesion to adherends (in particular, the rough surfaces of foams) and holding power as compared with pressure-sensitive adhesive sheets obtained with a solvent-based pressure-sensitive adhesive composition and they are hence inferior in practical properties such as unsusceptibility to edge peeling.

The present inventors made intensive investigations in order to eliminate the problem. As a result, they found that when an aqueous dispersion type monomer mixture containing an alkyl (meth)acrylate as a main component is polymerized with a silane monomer optionally in the presence of a chain transfer agent, then adhesion to adherends and holding power can be reconciled on a high level and practical properties (including unsusceptibility to edge peeling) equal to those of solvent-based pressure-sensitive adhesives can be obtained (see JP-A-2001-131511).

However, even with the pressure-sensitive adhesive described above, it is difficult to obtain a satisfactory adhesive force in application to rubber foams. There have further been cases where in application to some kinds of rubber foams, the adhesive force of the adhesive decreases with the lapse of time. This decrease in adhesive force with the lapse of time is a phenomenon observed not only in the case where foams are used as adherends but also in pressure-sensitive adhesive foam sheets in which a foam is used as the substrate.

SUMMARY OF THE INVENTION

One object of the invention is to provide an aqueous dispersion type pressure-sensitive adhesive composition which is excellent in adhesion to foams and unsusceptibility to edge peeling and retains stable adhesive force over a long period of time.

Another object of the invention is to provide a pressure-sensitive adhesive sheet using the aqueous dispersion type pressure-sensitive adhesive composition.

Still another object is to provide a pressure-sensitive adhesive rubber foam sheet using the pressure-sensitive adhesive sheet comprising the aqueous dispersion type pressure-sensitive adhesive composition.

The present inventors made intensive investigations in order to overcome the problems described above. As a result, they have found that the decrease in adhesive force with time is attributable to migration of nonpolar components (e.g., paraffin oil and asphalt) of the rubber foam to the pressure-sensitive adhesive layer. They have further found that the migration of nonpolar components of rubber foams can be prevented by adding a tackifier having a phenolic skeleton to a polymer obtained by copolymerizing an aqueous dispersion type monomer mixture containing a (meth) acrylic ester as a main component with a silane monomer. It has been thus found that a pressure-sensitive adhesive having excellent adhesion to rubber foams and excellent unsusceptibility to edge peeling and retaining excellent long-term adhesion stability can be obtained. The invention has been completed based on these findings.

The reasons why the addition of a tackifier having a phenolic skeleton to the pressure-sensitive adhesive composition brings about excellent effects are unclear. However, it is thought that a pressure-sensitive adhesive layer made of a lowly polar pressure-sensitive adhesive is apt to suffer migration of nonpolar components of rubber foams thereto and undergoes a decrease in adhesive force with the lapse of time, whereas a pressure-sensitive adhesive layer made of a highly polar pressure-sensitive adhesive is inhibited from suffering migration of those components and hence undergoes no decrease in adhesive force. Specifically, a pressure-sensitive adhesive layer containing a lowly polar polymerized rosin ester as a tackifier undergoes a decrease in adhesive force, whereas a pressure-sensitive adhesive layer containing a rosin-phenol or terpene-phenol tackifier, which is highly polar, is inhibited from undergoing a decrease in adhesive force. It is hence presumed that the phenolic skeletons contained in the tackifier molecules function effectively.

The aqueous dispersion type pressure-sensitive adhesive composition comprises an aqueous dispersion of a polymer obtained by copolymerizing a monomer mixture comprising one or more alkyl (meth)acrylates as the main component and at least one silane monomer, and a tackifier having a phenolic skeleton, added to the aqueous dispersion.

The pressure-sensitive adhesive sheet comprises a substrate, and disposed on one or both sides thereof, a pressure-sensitive adhesive layer comprising the aqueous dispersion type pressure-sensitive adhesive composition.

The pressure-sensitive adhesive rubber foam sheet comprises a rubber foam, and disposed on one or both sides thereof, either of the pressure-sensitive adhesive layer or the pressure-sensitive adhesive sheet, comprising the aqueous dispersion type pressure-sensitive adhesive composition.

Figure 1:
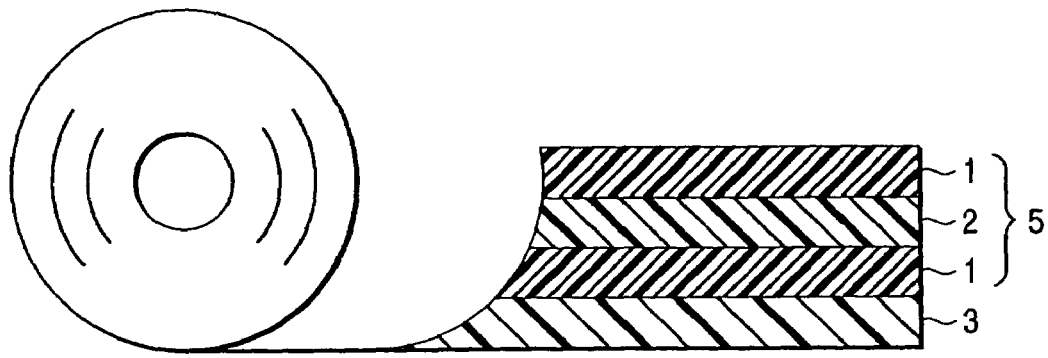
FIG. 1 is a sectional view diagrammatically illustrating one embodiment of the pressure-sensitive adhesive sheet according to the invention.

In the drawings
1: pressure-sensitive adhesive layer
2: substrate
3: release liner
4: pressure-sensitive adhesive layer
5: pressure-sensitive adhesive sheet
6: pressure-sensitive adhesive sheet
7: back coating layer
8: foam

DETAILED DESCRIPTION OF THE INVENTION

The term "solvent insoluble content" as used herein means the content determined in the following manner. A given amount (about 500 mg) of a sample is precisely weighed out (the weight of nonvolatiles contained therein is represented by $W_1$ (mg)). This sample is immersed in ethyl acetate at room temperature for 3 days. Thereafter, the insoluble matter is taken out and dried at 100° C. for 2 hours. The weight ($W_2$ (mg)) of the dried insoluble matter is measured, and the solvent insoluble content is calculated using the following equation.

Solvent insoluble content (wt %)=$(W_2/W_1) \times 100$

The aqueous dispersion type pressure-sensitive adhesive composition is obtained by adding a tackifier having a phenolic skeleton to an aqueous dispersion of a polymer obtained by copolymerizing a monomer mixture comprising one or more alkyl (meth)acrylates as the main component and at least one silane monomer.

Examples of the alkyl (meth)acrylates used as the main constituent monomers include compounds represented by the following formula (1):

$$CH_2=C(R_1)COOR_2 \qquad (1)$$

wherein $R_1$ represents a hydrogen atom or methyl, and $R_2$ represents an alkyl group having 2 to 14 carbon atoms.

Examples of $R_2$ include ethyl, propyl, isopropyl, butyl, isobutyl, isoamyl, hexyl, heptyl, 2-ethylhexyl, isooctyl, isononyl and isodecyl. Of these groups, alkyl groups having 2 to 10 carbon atoms, such as butyl or 2-ethylhexyl, are preferable.

The alkyl (meth)acrylates can be used alone or as a mixture of two or more thereof. For example, butyl acrylate alone or a combination of butyl acrylate and 2-ethylhexyl acrylate can be used as the alkyl acrylate(s). In this case, the ratio of the amount of 2-ethylhexyl acrylate to that of butyl acrylate is from about 0/100 to 55/45 (e.g., from 5/95 to 60/40).

In the monomer mixture containing one or more alkyl (meth)acrylates as the main component, the proportion of the alkyl (meth)acrylate(s) (e.g., any of the $C_{2-14}$ alkyl esters of (meth)acrylic acid) is generally 80% by weight or higher (e.g., from about 80 to 99.8% by weight), preferably 85% by weight or higher (e.g., from about 85 to 99.5% by weight), more preferably 90% by weight or higher (e.g., from about 90 to 99% by weight).

The monomer mixture usually contains a functional monomer (monomer containing a heat-crosslinkable functional group) so as to incorporate crosslinkable sites for thermal crosslinking. Use of this functional monomer as a comonomer ingredient also improves adhesion to adherends.

Examples of the functional monomer include carboxyl-containing monomers and anhydrides thereof, such as acrylic acid, methacrylic acid, itaconic acid, maleic acid, crotonic acid or maleic anhydride; hydroxyl-containing monomers such as 2-hydroxyethyl (meth)acrylate, 2-hydroxypropyl (meth)acrylate or 2-hydroxybutyl (meth)acrylate; amide group-containing monomers such as (meth)acrylamide, N,N-dimethyl(meth)acrylamide, N-methylol (meth)acrylamide, N-methoxymethyl(meth)acrylamide or N-butoxymethyl(meth)acrylamide; amino-containing monomers such as dimethylaminoethyl (meth)acrylate or t-butylaminoethyl (meth)acrylate; glycidyl-containing monomers such as glycidyl (meth)acrylate; (meth)acrylonitrile; N-(meth)acryloylmorpholine; and N-vinyl-2-pyrrolidone. Of these, for example, carboxyl-containing monomers such as acrylic acid or anhydrides of thereof are preferable. Those functional monomers can be used alone or in combination of two or more thereof.

The amount of the functional monomer used is, for example, from about 0.5 to 12 parts by weight, preferably from about 1 to 8 parts by weight, per 100 parts by weight of the alkyl (meth)acrylate(s).

Other copolymerizable monomers may be contained in the monomer mixture according to need so as to enhance properties such as cohesive force. Examples of such copolymerizable monomers include vinyl esters such as methyl (meth)acrylate or vinyl acetate; aromatic vinyl compounds such as styrene or vinyl toluene; (meth)acrylic esters of cyclic alcohols, such as cyclopentyl di(meth)acrylate or isobornyl (meth)acrylate; and (meth)acrylic esters of polyhydric alcohols, such as neopentyl glycol di(meth)acrylate, hexanediol di(meth)acrylate, propylene glycol di(meth)acrylate, trimethylolpropane tri(meth)acrylate, tetramethylolmethane tri(meth)acrylate or dipentaerythritol hexa(meth)acrylate. These copolymerizable monomers can also be used alone or in combination of two or more thereof.

The silane monomer that is copolymerized with the alkyl (meth)acrylate(s) is not particularly limited as long as it is a polymerizable compound having a silicon atom. However, silane compounds having a (meth)acryloyl group, such as, (meth)acryloyloxyalkylsilane derivatives, are preferred because they have excellent copolymerizability with the alkyl (meth)acrylates. Examples of the silane monomer include 3-methacryloyloxypropyltrimethoxysilane, 3-acryloyloxypropyltrimethoxysilane, 3-methacryloyloxypropyltriethoxysilane, 3-acryloyloxypropyltriethoxysilane, 3-methacryloyloxypropylmethyldimethoxysilane, 3-acryloyloxypropylmethyldimethoxysilane, 3-methacryloyloxypropylmethyldiethoxysilane, and 3-acryloyloxypropylmethyldiethoxysilane. These silane monomers can be used alone or in combination of two or more thereof.

Examples of copolymerizable silane monomers that can be used besides the compounds shown above include vinyltrimethoxysilane, vinyltriethoxysilane, 4-vinylbutyltrimethoxysilane, 4-vinylbutyltriethoxysilane, 8-vinyloctyltrimethoxysilane, 8-vinyloctyltriethoxysilane, 10-methacryloyloxydecyltrimethoxysilane, 10-acryloyloxydecyltrimethoxysilane, 10-methacryloyloxydecyltriethoxysilane, and 10-acryloyloxydecyltriethoxysilane.

The amount of the silane monomer used can appropriately be selected according to the kind of the alkyl (meth)acrylate(s), intended use, etc. However, when the silane monomer is copolymerized in an amount exceeding 1 part by weight per 100 parts by weight of the monomer mixture containing one or more alkyl (meth)acrylates as the main component (excluding the silane monomer), there are cases where tackiness decreases to such a degree as to make adhesion impossible. On the other hand, amounts thereof smaller than 0.005 parts by weight tend to result in a deficiency in polymer strength and hence in reduced cohesive force. Consequently, the amount of the silane monomer used is preferably from 0.005 to 1 part by weight, more preferably from 0.01 to 0.5 parts by weight, per 100 parts by weight of the monomer mixture (excluding the silane monomer).

The polymer contained in the aqueous dispersion type pressure-sensitive adhesive composition can be prepared by, for example, subjecting the above-described monomer mixture comprising one or more alkyl (meth)acrylates as the main component and at least one silane monomer, to the conventional emulsion polymerization. Thus, the desired polymer is obtained as a (meth)acrylate copolymer in the form of an aqueous dispersion.

The aqueous dispersion type pressure-sensitive adhesive composition especially preferably is a composition which contains a polymer obtained by polymerizing 100 parts by weight of a monomer mixture comprising one or more alkyl (meth)acrylates as the main component and giving a resin composition having a solvent insoluble content of 5% or lower when polymerized as a composition containing no silane monomer with from 0.005 to 1 part by weight of at least one silane monomer under the same conditions as those used for the polymerization of the composition containing no silane monomer. This aqueous dispersion type pressure-sensitive adhesive composition can reconcile excellent unsusceptibility to edge peeling and high holding power, regardless of the aqueous dispersion type.

The term "under the same conditions" as used above means that the polymerization conditions excluding the presence or absence of a silane monomer, e.g., reaction temperature, reaction time, kind and amount of a polymerization initiator used, and kind and amount of a chain transfer agent used, are equal.

In case where a monomer mixture which gives a resin composition having a solvent insoluble content exceeding 5% when polymerized as a composition containing no silane monomer is polymerized with a silane monomer, an aqueous dispersion type pressure-sensitive adhesive composition containing the resulting polymer is apt to have reduced unsusceptibility to edge peeling.

Emulsion polymerization methods that can be used in the invention include general emulsion polymerization techniques such as en bloc polymerization, continuous dropping polymerization or portion-wise dropping polymerization. The polymerization temperature is, for example, from about 20 to 100° C.

Examples of polymerization initiators for use in the polymerization include azo initiators such as 2,2'-azobisisobutyronitrile, 2,2'-azobis(2-methylpropionamidine) disulfate, 2,2'-azobis(2-amidinopropane) dihydrochloride, 2,2'-azobis[2-(5-methyl-2-imidazolin-2-yl)propane] dihydrochloride or 2,2'-azobis(N,N'-dimethyleneisobutylamidine); persulfates such as potassium persulfate or ammonium persulfate; peroxide initiators such as benzoyl peroxide, t-butyl hydroperoxide or hydrogen peroxide; substituted ethane initiators such as phenyl-substituted ethanes; aromatic carbonyl compounds; and redox initiators such as combinations of a persulfate and sodium hydrogen sulfite or combinations of a peroxide and sodium ascorbate. However, polymerization initiators that can be used should not be limited to these examples. The amount of the polymerization initiator used is, for example, from about 0.005 to 1 part by weight per 100 parts by weight of the whole monomer mixture.

A chain transfer agent may be used for the polymerization. Examples of the chain transfer agent include ordinary chain transfer agents such as mercaptans, e.g., dodecanethiol. The amount of the chain transfer agent used is, for example, from about 0.001 to 0.5 parts by weight per 100 parts by weight of the whole monomer mixture.

Examples of emulsifying agents used include anionic emulsifying agents such as sodium lauryl sulfate, ammonium lauryl sulfate, sodium dodecylbenzenesulfonate, sodium polyoxyethylene alkyl ether sulfates, ammonium polyoxyethylene alkylphenyl ether sulfates or sodium polyoxyethylene alkylphenyl ether sulfates; and nonionic emulsifying agents such as polyoxyethylene alkyl ethers or polyoxyethylene alkylphenyl ethers. These emulsifying agents may be used alone or in combination of two or more thereof. The amount of the emulsifying agent used is, for example, from about 0.2 to 10 parts by weight, preferably from about 0.5 to 5 parts by weight, per 100 parts by weight of the whole monomer mixture.

Besides being prepared by the emulsion polymerization process described above, the aqueous dispersion type pressure-sensitive adhesive composition may be produced by obtaining the (meth)acrylate copolymer by a method other than emulsion polymerization and then dispersing the copolymer in water with the aid of an emulsifying agent to prepare an aqueous dispersion.

An organic compound capable of bonding to the silane monomer may be added to the aqueous (meth)acrylate copolymer dispersion containing the silane monomer, for the purpose of preventing the adhesive layer formed from the aqueous dispersion type pressure-sensitive adhesive composition from having increased peel force with the passage of time after application to a release liner or back coating layer coated with or formed from a silicone release agent. The organic compound capable of bonding to the silane monomer is not particularly limited as long as it has an active group (e.g., hydroxyl or carboxyl) capable of reacting and bonding to Si—OH group which generates by the hydrolysis of an Si—OR group (R is an alkyl group, e.g., methyl or ethyl) of the silane monomer. However, a silane compound having satisfactory reactivity with the silane monomer is desirable.

Examples of the silane compound include compounds having an Si—H group, Si—OH group, or Si—OR group (R is an alkyl group, e.g., methyl or ethyl) in the molecule. Specific examples thereof include methyltrimethoxysilane, butyltrimethoxysilane, dodecyltrimethoxysilane, hexadecyltrimethoxysilane, octadecyldimethylmethoxysilane, dimethoxydimethylsilane, methoxytrimethylsilane, diethoxydimethylsilane, methyltriethoxysilane, phenyltrimethoxysilane, phenyltriethoxysilane, dimethoxydiphenylsilane, diphenylethoxymethylsilane, dimethoxymethylphenylsilane, triethylsilane, tripropylsilane, trimethylsilanol, and triethylsilanol.

Although the silane compound preferably does not have a functional group reactive with the polymer, it may have one or more functional groups having limited reactivity with the polymer. Examples of silane compounds having such a functional group include (meth)acryloyl-containing silane compounds such as 3-methacryloyloxypropyltrimethoxysilane or 3-acryloyloxypropyltrimethoxysilane, dimethoxy-3-mercaptopropylmethylsilane, and 3-mercaptopropyltrimethoxysilane. These silane compounds may be used alone or in combination of two or more thereof.

When the organic compound capable of bonding to the silane monomer is used in an amount smaller than 0.005 parts by weight per 100 parts by weight of the polymer formed mainly from one or more (meth)acrylates, there are cases where increase in peel force with the passage of time cannot be prevented. When the amount of the organic compound exceeds 1 part by weight, there are cases where cohesive force decreases and adherend fouling occurs. Furthermore, when this organic compound capable of bonding to the silane monomer is a polyfunctional compound, there are cases where peel force increases rather than decreases. This may be because when the organic compound partly remains unreacted, this unreacted compound functions as a crosslinking agent. Consequently, in the invention, the amount of the organic compound capable of bonding to the silane monomer is preferably from 0.005 to 1 part by weight, more preferably from 0.01 to 0.5 parts by weight, per 100 parts by weight of the polymer.

In copolymerizing the monomer mixture comprising one or more (meth)acrylates as the main component and at least one silane monomer for obtaining the polymer used in the invention, the silane monomer copolymerized with the (meth)acrylates preferably is a methoxysilane monomer, which is a silane monomer having an Si—OR group wherein R is methyl, from the standpoint of preventing the adhesive layer from having increased peel force with the passage of time after application to a release liner or back coating layer coated with or formed from a silicone release agent. Examples of the methoxysilane monomer include 3-methacryloyloxypropyltrimethoxysilane, 3-acryloyloxypropyltrimethoxysilane, 3-methacryloyloxypropylmethyldimethoxysilane, 3-acryloyloxypropylmethyldimethoxysilane, vinyltrimethoxysilane, 4-vinylbutyltrimethoxysilane, 8-vinyloctyltrimethoxysilane, 10-methacryloyloxydecyltrimethoxysilane, and 10-acryloyloxydecyltrimethoxysilane.

Methoxysilane monomers have a high hydrolysis rate. It is hence presumed that when a methoxysilane monomer is used, most of the methoxy groups are hydrolyzed into silanol groups during the polymerization and most of the silane monomer incorporated into the polymer is hence consumed by crosslinking during drying. Thus, the amount of the silane monomer capable of reacting with the release layer during long-term storage becomes small, and this is thought to be effective in preventing the increase in peel force with the passage of time.

For the same purpose, it is preferred to use methacrylic acid as the functional monomer in copolymerizing the monomer mixture comprising one or more alkyl (meth) acrylates as the main component and at least one silane monomer to obtain a polymer. The reason why use of the polymer thus obtained by copolymerizing methacrylic acid is effective in preventing the increase in peel force with the passage of time may be that since methacrylic acid is more hydrophobic than acrylic acid in aqueous dispersions, it is distributed even in inner parts of the fine particles and, hence, accelerates the hydrolysis of the silane monomer incorporated into inner parts of the polymer.

A crosslinking agent can be used according to the intended use of the pressure-sensitive adhesive. A crosslinking agent ordinarily used can be used as the crosslinking agent. Examples the crosslinking agent include isocyanate crosslinking agents, epoxy crosslinking agents, oxazoline crosslinking agents, aziridine crosslinking agents, and metal chelate crosslinking agents. Such crosslinking agents may be either oil-soluble or water-soluble.

The aqueous dispersion type pressure-sensitive adhesive composition is obtained by adding a tackifier having a phenolic skeleton to an aqueous dispersion of the (meth) acrylate polymer containing silane monomer units.

The tackifier used is a compound having a phenolic skeleton in the molecule. Examples of the tackifier include rosin-phenol resins, terpene-phenol resins, and alkylphenol resins.

Commercial products of the rosin-phenol resins that can be used include "Tamanol", manufactured by Arakawa Chemical Industries, Ltd., and "Sumilite Resin", manufactured by Sumitomo Durez Co., Ltd.; ones of the terpene-phenol resins include "Nanolet", "YS Polyster", and "Mightyace", manufactured by Yasuhara Chemical Co., Ltd.; and ones of the alkylphenol resins include "Hitanol", manufactured by Hitachi Chemical Co., Ltd., "Tackrol", manufactured by Sumitomo Chemical Co., Ltd., and "PP Series", manufactured by Gun-ei Chemical Industry Co., Ltd. These tackifiers may be used alone or in combination of two or more thereof.

When the tackifier is used in an amount less than 5 parts by weight or exceeding 50 parts by weight per 100 parts by weight of the polymer mainly comprising one or more (meth)acrylates, there are cases where pressure-sensitive adhesive properties sufficient for practical use are not obtained, resulting in, for example, insufficient adhesion to rubber foams. Consequently, the amount of the tackifier is preferably from 5 to 50 parts by weight, more preferably from 10 to 40 parts by weight, per 100 parts by weight of the polymer.

Other additives ordinarily used in pressure-sensitive adhesives may be contained in the aqueous dispersion type pressure-sensitive adhesive composition according to need. Examples the other additives include aging inhibitors, fillers, pigments, and colorants.

The pH of the aqueous dispersion type pressure-sensitive adhesive composition is usually adjusted to 7 to 9 with a base such as ammonia in order to stabilize the particles. However, in case where the residual ammonia is present in a large amount, the increase in peel force with the passage of time after application to a release liner or back coating layer coated with or formed from a silicone release agent proceeds. It is therefore preferred to add ammonia in a smaller amount. The pH is more preferably adjusted to about 7 to 8.

Embodiments of the pressure-sensitive adhesive sheet of the invention will be explained below by reference to drawings, but the invention should not be construed as being limited to these in any way.

The pressure-sensitive adhesive sheet of the invention has a constitution comprising a substrate and, disposed on one or each side thereof, a pressure-sensitive adhesive layer comprising the aqueous dispersion type pressure-sensitive adhesive composition described above. FIG. 1 is a sectional view diagrammatically illustrating one embodiment of the pressure-sensitive adhesive sheet; this embodiment comprises a substrate film and a pressure-sensitive adhesive layer disposed on both sides of the film.

In FIG. 1, 5 is a pressure-sensitive adhesive sheet, 1 is a pressure-sensitive adhesive layer comprising the aqueous dispersion type pressure-sensitive adhesive composition, 2 is a substrate, and 3 is a release liner. The pressure-sensitive adhesive sheet 5 is obtained by: coating the substrate 2 with an aqueous dispersion type pressure-sensitive adhesive composition obtained by adding a tackifier having a phenolic skeleton to an aqueous dispersion of a copolymer of a monomer mixture comprising at least one silane monomer and one or more alkyl (meth)acrylates as the main component; and thermally crosslinking the copolymer to form the pressure-sensitive adhesive layers 1. A release liner 3 is applied to the adhesive sheet in order to protect the pressure-sensitive adhesive surface. Although this pressure-sensitive adhesive sheet preferably is wound into a roll as shown in the figure, it may be stored as it is. A method may be used, in which a pressure-sensitive adhesive layer 1 is formed on a release liner 3 and then bonded to the substrate 2.

Examples of materials used as the substrate 2 include plastic films such as polypropylene films, ethylene/propylene copolymer films, polyester films or poly(vinyl chloride) films; papers such as Japanese paper or kraft paper; fabrics such as cotton fabrics or staple-fiber fabrics; nonwoven fabrics such as polyester nonwoven fabrics or vinylon nonwoven fabrics; and metal foils. The plastic films may be either unstretched films or stretched (uniaxially stretched or biaxially stretched) films. The side of the substrate to which the pressure-sensitive adhesive is applied may have undergone a surface treatment with, e.g., a primer in ordinary use or a corona discharge. Although the thickness of the substrate may be suitably selected according to purposes, it is generally from about 10 to 500 µm.

In forming the pressure-sensitive adhesive layers 1, the aqueous dispersion type pressure-sensitive adhesive composition can be applied to the substrate 1 with an ordinary coater such as a gravure roll coater, reverse-roll coater, kiss-roll coater, dip roll coater, bar coater, knife coater or spray coater. The aqueous dispersion type pressure-sensitive adhesive composition is applied so as to result in a pressure-sensitive adhesive layer having a thickness of, for example, from about 10 to 100 µm on a dry basis.

The aqueous dispersion type pressure-sensitive adhesive composition applied is crosslinked by heating to thereby form the pressure-sensitive adhesive layers 1. This thermal crosslinking is accomplished by an ordinary method, for example, by heating the composition to a temperature at which a crosslinking reaction proceeds, according to the kinds of the silane monomer and crosslinking agent. After crosslinking, the pressure-sensitive adhesive layers have a solvent insoluble content of, for example, from about 15 to 70% by weight. The solvent-soluble components of the crosslinked pressure-sensitive adhesive layers have a molecular weight (weight-average molecular weight; calculated for standard polystyrene) of, for example, about from 100,000 to 600,000, preferably about from 200,000 to 450,000. The molecular weights of the solvent-insoluble components and solvent-soluble components of the crosslinked pressure-sensitive adhesive layers can be regulated to any desired values by, for example, suitably regulating the proportions of the silane monomer and functional monomer in the whole monomer mixture and the kinds and amounts of the chain transfer agent and crosslinking agent, in particular, by suitably regulating the amounts of the silane monomer and chain transfer agent.

The release liner 3 comprises a sheet substrate and, disposed on one or each side thereof, a release layer comprising a silicone release agent, long-chain alkyl type release agent, fluorochemical release agent, or the like. This release liner may be one heretofore in use. Although the thickness thereof is not particularly limited, it is preferably 15 µm or larger, more preferably from 25 to 500 µm.

Figure 2:
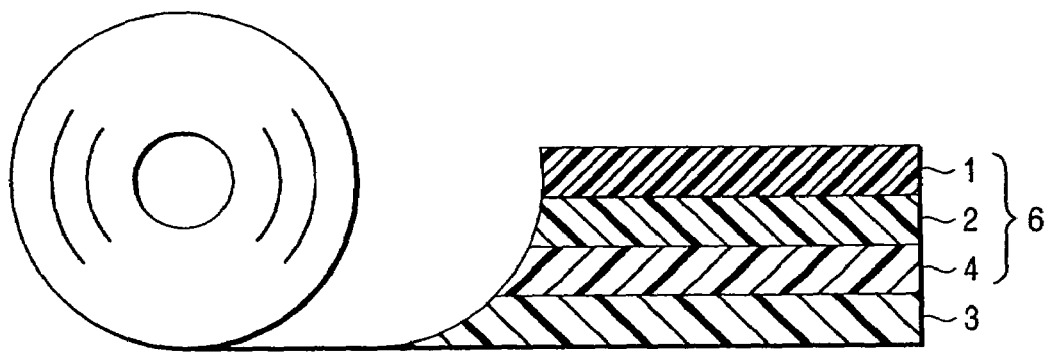
FIG. 2 is a sectional view diagrammatically illustrating another embodiment of the pressure-sensitive adhesive sheet according to the invention.

FIG. 2 is a sectional view diagrammatically illustrating another embodiment of the pressure-sensitive adhesive sheet of the invention. This pressure-sensitive adhesive sheet 6 comprises: a substrate 2; a pressure-sensitive adhesive layer 1 of the kind described above which is disposed on one side of the substrate 2; and a pressure-sensitive adhesive layer 4 disposed on the other side of the substrate 2 and comprising a pressure-sensitive adhesive composition different from that used for the pressure-sensitive adhesive layer 1. A release liner 3 has been applied to the adhesive sheet in order to protect the pressure-sensitive adhesive surface. The pressure-sensitive adhesive layer 4 in this embodiment is not particularly limited, and a known pressure-sensitive adhesive composition of the acrylic, rubber-based, silicone, or another type can be used for forming the adhesive layer according to the intended use of the adhesive sheet and the kind of the adherend. Although this pressure-sensitive adhesive sheet preferably is wound into a roll as shown in the figure, it may be stored as it is. In the constitution shown in FIG. 2, the release liner 3 is in contact with the pressure-sensitive adhesive layer 4. However, a constitution may be employed, in which the release linear 3 is in contact with the pressure-sensitive adhesive layer 1. In this case, the constitution of this pressure-sensitive adhesive sheet may be changed according to the kind of the adherend to which the adhesive sheet is to be applied first.

Figure 3:
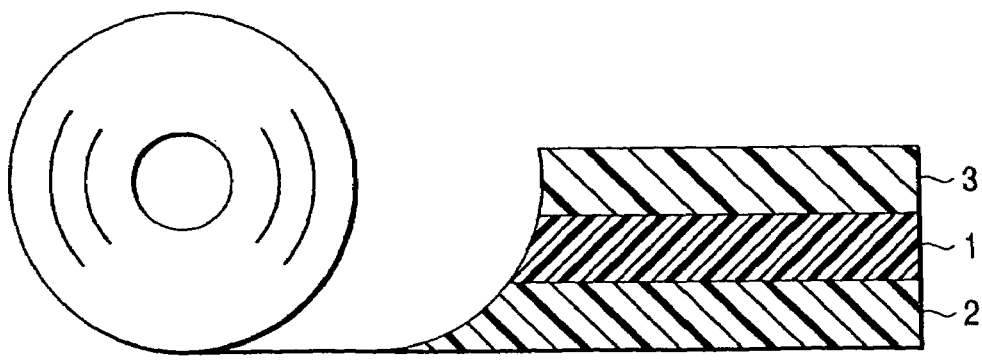
FIG. 3 is a sectional view diagrammatically illustrating still another embodiment of the pressure-sensitive adhesive sheet according to the invention.

FIG. 3 is a sectional view diagrammatically illustrating still another embodiment of the pressure-sensitive adhesive sheet of the invention. This embodiment has a constitution comprising a substrate 2, a pressure-sensitive adhesive layer 1 disposed on one side of the substrate 2, and a release liner 3 applied thereto. Although this pressure-sensitive adhesive sheet preferably is wound into a roll as shown in the figure, it may be stored as it is.

Figure 4:
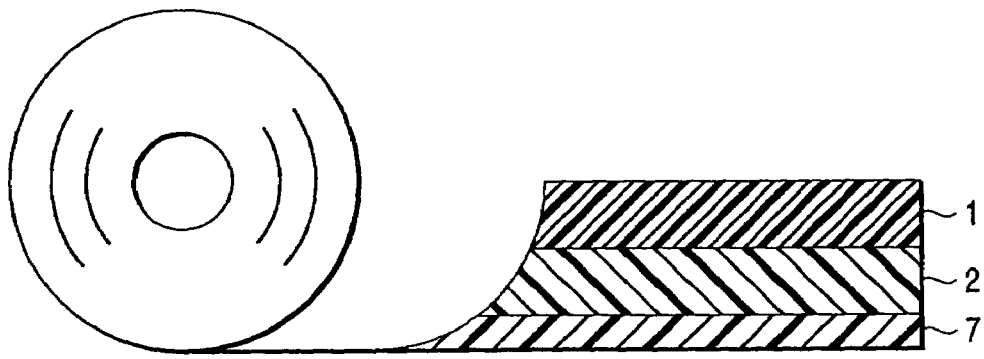
FIG. 4 is a sectional view diagrammatically illustrating a further embodiment of the pressure-sensitive adhesive sheet according to the invention.

FIG. 4 is a sectional view diagrammatically illustrating a further embodiment of the pressure-sensitive adhesive sheet of the invention. This embodiment has a constitution comprising a substrate 2 on which a back coating layer 7 has been formed and a pressure-sensitive adhesive layer 1 disposed on the substrate 2. As shown in the figure, this pressure-sensitive adhesive sheet is wound so that the pressure-sensitive adhesive layer 1 is in contact with the back coating layer 4, and stored in this roll state.

The back coating layer 7 used can be one formed on the substrate 1 by applying a silicone release agent, long-chain alkyl type release agent, fluorochemical release agent, or the like by the conventional method.

The pressure-sensitive adhesive sheet has an excellent adhesive force in application to rubber foams. Desirably, the adhesive force thereof is generally 3 N/20 mm or higher, preferably 4 N/20 mm or higher, more preferably 5 N/20 mm or higher (180° peel; peel rate, 300 mm/min; in 23° C. 60% RH atmosphere).

The invention further provides a pressure-sensitive adhesive rubber foam sheet which comprises a rubber foam and, disposed on one or each side thereof, a pressure-sensitive adhesive layer comprising the aqueous dispersion type pressure-sensitive adhesive composition described above.

The invention furthermore provides a pressure-sensitive adhesive rubber foam sheet which comprises a rubber foam and, disposed on one or each side thereof, the pressure-sensitive adhesive sheet described above.

Figure 5:
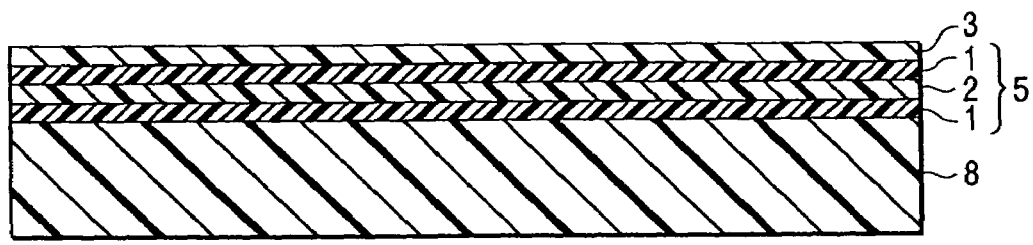
FIG. 5 is a sectional view diagrammatically illustrating one embodiment of the pressure-sensitive adhesive rubber foam sheet according to the invention.

FIG. 5 is a sectional view diagrammatically illustrating one embodiment of the pressure-sensitive adhesive rubber foam sheet. This embodiment comprises a rubber foam and, disposed on one side thereof, the pressure-sensitive adhesive sheet 5 shown in FIG. 1. In FIG. 5, 8 is a rubber foam, and the other numerals have the same meanings as defined above. The pressure-sensitive adhesive sheet 5 may be disposed on each side of the rubber foam 8.

Figure 6:
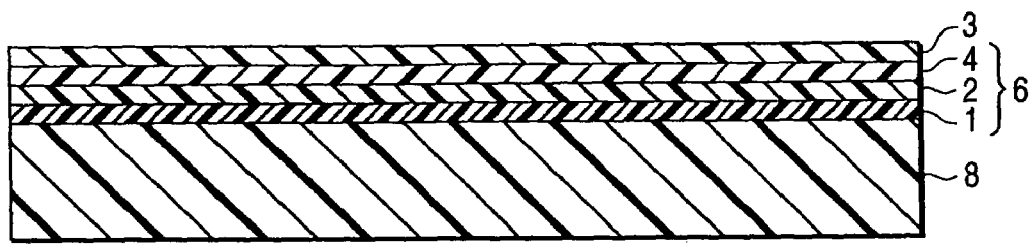
FIG. 6 is a sectional view diagrammatically illustrating another embodiment of the pressure-sensitive adhesive rubber foam sheet according to the invention.

FIG. 6 is a sectional view illustrating another embodiment of the pressure-sensitive adhesive foam sheet of the invention. This embodiment has a constitution comprising a rubber foam 8 and, disposed on one side thereof, the pressure-sensitive adhesive sheet 6 shown in FIG. 2. In this constitution, the pressure-sensitive adhesive sheet 6 is adhered to the foam 8 through the pressure-sensitive adhesive layer 1. The pressure-sensitive adhesive sheet 6 may be disposed on both sides of the rubber foam 8.

Figure 7:
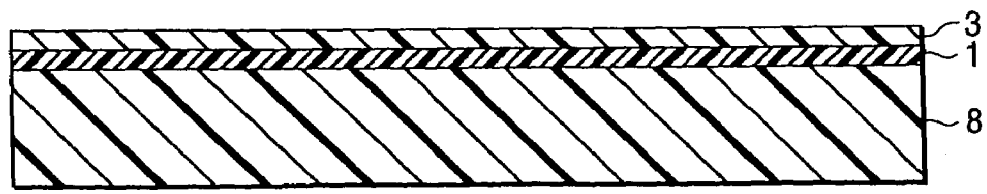
FIG. 7 is a sectional view diagrammatically illustrating still another embodiment of the pressure-sensitive adhesive rubber foam sheet according to the invention.

According to the invention, a pressure-sensitive adhesive layer 1 can be formed on a release liner 3 to thereby produce a so-called substrate-less double-faced pressure-sensitive adhesive sheet, which includes no substrate. When this adhesive sheet is applied to, for example, a foam 8 as shown by a sectional view in FIG. 7, a pressure-sensitive adhesive rubber foam sheet can be produced. Namely, this constitution comprises a rubber foam and, disposed on one side (or each side) thereof, a pressure-sensitive adhesive layer comprising the aqueous dispersion type pressure-sensitive adhesive composition.

The rubber foam 8 used can be produced by thermally vulcanizing and foaming a composition comprising a rubbery polymer, vulcanizing agent, blowing agent, vulcanization accelerator, blowing aid, etc.

The rubbery polymer is not particularly limited and can be an appropriate one heretofore in use. Examples the rubbery polymer include ethylene/propylene/diene rubbers (EPDM), ethylene/propylene rubbers, ethylene/propylene terpolymers, silicone rubbers, fluororubbers, acrylic rubbers, polyurethane rubbers, polyamide rubbers, natural rubber, polyisobutylene, polyisoprene, chloroprene rubbers, butyl rubbers, nitrile-butyl rubbers, styrene/butadiene rubbers, styrene/butadiene/styrene rubbers, styrene/isoprene/styrene rubbers, styrene/ethylene/butadiene rubbers, styrene/ethylene/butylene/styrene rubbers, styrene/isoprene/propylene/ styrene rubbers, chlorosulfonated polyethylene, and rubbery copolymers comprising units derived from an α-olefin such as butene-1 and a cyclic or noncyclic polyene having unconjugated double bonds, such as dicyclopentadiene or ethylidenenorbornene. Of those, EPDM is preferable from the standpoints of suitability for practical use, etc.

The vulcanizing agent also is not particularly limited and can be an appropriate one heretofore in use. Examples the vulcanizing agent include sulfur, sulfur compounds, selenium, magnesium oxide, lead monoxide, zinc oxide, organic peroxides, polyamines, oximes (e.g., p-quinone dioxime and p,p'-dibenzoylquinone dioxime), nitroso compounds (e.g., p-dinitrosobenzene), resins (e.g., alkylphenol-formaldehyde resins and melamine-formaldehyde condensates), and ammonium salts (e.g., ammonium benzoate).

One or more of those vulcanizing agents can be suitably selected and used. From the standpoints of, e.g., the durability and other properties of the rubber foam obtained which are influenced by vulcanizability and foamability, it is preferred to use sulfur or a sulfur compound, especially sulfur. The amount of the vulcanizing agent used can be suitably determined according to, e.g., the efficiency of vulcanization, which depends on the kind of the vulcanizing agent. However, in the case of sulfur or a sulfur compound, for example, it is used in an amount of generally from 0.1 to 10 parts by weight, preferably from 0.5 to 5 parts by weight, per 100 parts by weight of the rubbery polymer.

The blowing agent is not particularly limited. For example, an inorganic blowing agent or an organic blowing agent is used.

As the inorganic blowing agent, for example, ammonium carbonate, ammonium hydrogen carbonate, sodium hydrogen carbonate, ammonium nitrite, sodium boron hydride or an azide may be used. As the organic blowing agent, for example, an azo compound (e.g., azobisisobutyronitrile, azodicarboxamide (ADCA) or barium azodicarboxylate), fluoroalkane (e.g., trichloromonofluoromethane or dichloromonofluoromethane), hydrazine compound (e.g., p-toluenesulfonyl hydrazide, diphenyl sulfone-3,3'-disulfonyl hydrazide, or 4,4'-oxybis(benzenesulfonyl hydrazide)), semicarbazide compound (e.g., p-toluylenesulfonyl semicarbazide or 4,4'-oxybis(benzenesulfonyl semicarbazide)), triazole compound (e.g., 5-morpholinyl-1,2,3,4-thiatriazole), or N-nitroso compound (e.g., N,N'-dinitrosopentamethylenetetramine or N,N'-dimethyl-N,N'-dinitrosoterephthalamide) may be used.

One or more of those blowing agents can be suitably selected and used. From the standpoints of, e.g., properties of the rubber foam obtained which are influenced by foamability, it is preferred to use an organic blowing agent such as an azo compound or an N-nitroso compound. The proportion of the blowing agent incorporated can be suitably determined according to, e.g., the desired properties of the foam obtained. However, the amount of the blowing agent used is generally from 0.1 to 100 parts by weight, preferably from 0.5 to 50 parts by weight, more preferably from 1 to 30 parts by weight, per 100 parts by weight of the rubbery polymer.

In producing the rubber foam, it is preferred to incorporate a vulcanization accelerator for accelerating vulcanization and a blowing aid for securing satisfactory foaming.

Examples of the vulcanization accelerator that may be used include a dithiocarbamic acid compound (e.g., sodium dimethyldithiocarbamate, sodium diethyldithiocarbamate, zinc dimethyldithiocarbamate, or zinc diethyldithiocarbamate), thiazole compound (e.g., 2-mercaptobenzothiazole or dibenzothiazyl disulfide), guanidine compound (e.g., diphenylguanidine or di-o-tolylguanidine), sulfenamide compound (e.g., benzothiazyl-2-diethylsulfenamide or N-cyclohexyl-2-benzothiazylsulfenamide), thiuram compound (e.g., tetramethylthiuram monosulfide or tetramethylthiuram disulfide), xanthogenic acid compound (e.g., sodium isopropylxanthogenate or zinc isopropylxanthogenate), aldehyde ammonia compound (e.g., acetaldehyde ammonia or hexamethylenetetramine), aldehydeamine compound (e.g., n-butyraldehyde-aniline or butyraldehyde monobutylamine), or thiourea compound (e.g., diethylthiourea or trimethylthiourea). One or more of such vulcanization accelerators can be suitably selected and used. From the standpoints of, e.g., vulcanization acceleration, it is preferred to use a dithiocarbamic acid compound in combination with a thiazole compound.

The proportion of the vulcanization accelerator incorporated is, for example, from 0.1 to 10 parts by weight, preferably from 0.5 to 5 parts by weight, per 100 parts by weight of the rubbery polymer from the standpoints of non-blooming properties, vulcanization acceleration, etc.

A vulcanization retarder may be suitably incorporated for the purpose of, e.g., regulating moldability, contrary to the addition of a vulcanization accelerator. Examples of the vulcanization retarder include organic acids (e.g., phthalic anhydride, benzoic acid, and salicylic acid) and amines (e.g., N-nitrosodiphenylamine and N-nitrosophenyl-$\beta$-naphthylamine).

Examples of the blowing aid that may be used include a urea compound, salicylic acid compound, or benzoic acid compound. One or more of such blowing aids can be suitably selected and used. It is, however, preferred to use a urea compound because it is less apt to influence vulcanization and is inexpensive. The proportion of the blowing aid incorporated is, for example, from 1 to 15 parts by weight, preferably from 2 to 10 parts by weight, more preferably from 3 to 8 parts by weight, per 100 parts by weight of the rubbery polymer.

It is preferred to incorporate a filler, processing oil, lubricant, and the like in producing the rubber foam, according to the intended use of the foam. Furthermore, conventional additives such as a plasticizer, flame retardant, aging inhibitor, antioxidant, pigment, colorant or antifungal agent may be suitably incorporated.

Examples of the filler that may be used include zinc white, carbon black, calcium carbonate, magnesium carbonate, silicic acid or a salt thereof, talc, mica, bentonite, silica, alumina, aluminum silicate, acetylene black, or aluminum powder. One or more of these fillers can be suitably selected and used. Zinc white and carbon black are preferred because zinc white functions also as a stabilizer and carbon black functions also as a reinforcement. In general, calcium carbonate is recommended. The proportion of the filler incorporated is, for example, from 80 to 200 parts by weight, preferably from 10 to 180 parts by weight, per 100 parts by weight of the rubbery polymer.

Examples of the processing oil that may be used include a paraffinic oil and a petroleum oil. Preferably, a process oil is used. The proportion of the processing oil incorporated is, for example, from 10 to 60 parts by weight, preferably from 30 to 50 parts by weight, per 100 parts by weight of the rubbery polymer. Addition of the processing oil facilitates kneading in preparing a composition and further facilitates foaming.

Examples of the lubricant that may be used include stearic acid and an ester thereof. The proportion of the lubricant incorporated is, for example, from 1 to 5 parts by weight, preferably from 2 to 4 parts by weight, per 100 parts by weight of the rubbery polymer. Addition of the lubricant, for example, reduces adhesion to rolls during kneading and thereby improves processability.

Examples of the plasticizer that may be used include a paraffin (e.g., chlorinated paraffin), wax, naphthene, aromatic oil, asphalt, drying oil (e.g., linseed oil), animal or vegetable oil, low-molecular polymer, phthalic ester, phosphoric ester, alkylsulfonic acid ester, and tackifier. Addition of the plasticizer makes the composition soft and thereby facilitates foaming.

Examples of the flame retardant that may be used include aluminum hydroxide and magnesium hydroxide.

In producing the rubber foam, a non-rubbery polymer may be further incorporated according to the intended purpose and use of the foam. Examples of this polymer used include acrylic polymers (e.g., poly(alkyl (meth)acrylate)s), poly(vinyl chloride), polyethylene, polypropylene, ethylene/vinyl acetate copolymers, poly(vinyl acetate), polyamides, polyesters, chlorinated polyethylene, urethane polymers, styrene polymers, silicone polymers, and epoxy resins.

One or more of those non-rubbery polymers can be suitably selected and used according to the intended purpose and use of the rubber foam. The proportion of the non-rubbery polymer incorporated is, for example, up to 50% by weight, preferably up to 30% by weight, more preferably up to 15% by weight, based on the rubbery polymer.

In producing the rubber foam used in the invention, a composition is first prepared in the following manner. Compounding ingredients such as a rubbery polymer, vulcanization aid, filler and processing oil are kneaded with a kneading machine such as a kneader or mixing rolls. In this kneading, the ingredients may be suitably heated. Subsequently, a vulcanizing agent, blowing agent, and blowing aid are suitably selected and added to the resulting mixture, and all these materials are further kneaded with, e.g., mixing rolls. Thus, a composition is prepared. The desired rubber foam can be obtained by heating this composition.

Although the rubber foam used in the invention can be formed by thermally vulcanizing and foaming the composition described above, this rubber foam formation can be conducted by a method in which the composition is molded into a given shape, e.g., a sheet, and this molding is heated to give a vulcanized foam. In this case, the molded composition may be one which has been molded into any desired shape by an appropriate technique. The shape is not particularly limited.

Consequently, the molded composition vulcanized and foamed may be obtained by molding the composition into a sheet or another shape by an appropriate technique such as one employing mixing rolls and calender rolls or extrusion molding. Alternatively, the molded composition may be one which has been molded into a given shape having, e.g., recesses and protrusions using a given mold by an appropriate technique such as, e.g., injection molding or press forming.

For producing the foam having recesses and protrusions described above, a method may be used, in which an unvulcanized molding is placed on a molding die having recesses and protrusions and heated thereon to thereby cause the composition constituting the molding to flow and penetrate into the recessed areas of the die before being vulcanized and foamed. This method has advantages, for example, that even when a fluted die having a complicated structure with deep recesses and protrusions is used, these recesses and protrusions can be precisely transferred.

The molded composition hence has any desired dimensions, which may be suitably determined according to the desired shape of the rubber foam to be obtained, etc. In the case of a sheet or the like, the thickness thereof is generally 100 mm or smaller, preferably from 1 $\mu$m to 80 mm, more preferably from 10 $\mu$m to 50 mm.

The vulcanization/foaming treatment described above can be conducted under appropriate conditions heretofore in use according to the vulcanization initiation temperature, foaming temperature, and the like, which depend on the vulcanizing agent, blowing agent, and the like used. The vulcanization/foaming temperature is generally about 200° C. or lower, preferably from 120 to 180° C. In this vulcanization/foaming treatment, the composition generally softens and the blowing agent decomposes to form a cellular structure simultaneously with progress of vulcanization to thereby form the desired vulcanized foam. This vulcanization/foaming treatment may be performed under pressure for the purpose of, e.g., regulating expansion ratio. Conditions for this pressurizing can be the same as ones heretofore in use.

The expansion ratio (ratio of the density before foaming to that after foaming) of the rubber foam formed is suitably determined according to the intended use, etc. In general, the expansion ratio in terms of density is regulated to 0.5 g/cm$^3$ or lower, preferably 0.20 g/cm$^3$ or lower, more preferably 0.15 g/cm$^3$ or lower. This density regulation can be accomplished by, for example, regulating the expansion ratio by changing the amount of the blowing agent incorporated, time period of the vulcanization/foaming treatment, vulcanization/foaming temperature, etc. Furthermore, the cellular structure of the vulcanized foam obtained, e.g., a closed-cell structure, open-cell structure, or structure having both closed cells and open cells, can be regulated by, for example, regulating the expansion ratio.

The pressure-sensitive adhesive rubber foam sheet of the invention is desirable from the standpoint of environmental health because the aqueous dispersion type acrylic pressure-sensitive adhesive is used in producing the adhesive sheet. The pressure-sensitive adhesive rubber foam sheet has exceedingly high unsusceptibility to edge peeling and holding power and further retains stable adhesive force over a long period of time. This adhesive sheet can hence be used in various applications where related-art products have been used, such as cushioning materials, pads, sealing materials for various purposes including airproofing and waterproofing, heat insulators, and vibration-damping materials for sound insulation or vibration damping.

The invention will be explained below in greater detail by reference to the following Examples, but the invention should not be construed as being limited to these Examples. Hereinafter, all "parts" and "percents" are by weight unless otherwise indicated.

EXAMPLE 1

A reactor equipped with a condenser tube, nitrogen introduction tube, thermometer, and stirrer was used to conduct polymerization in the following manner. 70 parts of butyl acrylate, 30 parts of 2-ethylhexyl acrylate, 3 parts of acrylic acid, 0.05 parts of 3-methacryloyloxypropyltrimethoxysilane ("KBM-503" manufactured by Shin-Etsu Silicone Co., Ltd.), 0.05 parts of dodecanethiol (chain transfer agent), and 0.1 part of 2,2'-azobis[2-(5-methyl-2-imidazolin-2-yl)propane] dihydrochloride (initiator) were added to 100 parts of water containing 1.5 parts of sodium polyoxyethylene lauryl sulfate (emulsifying agent). The resulting mixture was emulsion-polymerized to obtain a polymer. When a mixture having the same composition except that the silane monomer was omitted was polymerized in the same manner, this polymerization yielded a polymer having a solvent insoluble content of 0%.

10% ammonia water was added to the polymer emulsion obtained above to adjust the pH of the emulsion to 8. 0.06 parts of n-decyltrimethoxysilane ("AY43-210MC" manufactured by Dow Corning Toray Silicone Co., Ltd.) was added thereto as a silane compound to obtain an aqueous dispersion. 30 parts on a solid basis of a rosin-phenol resin ("Tamanol E-100" manufactured by Arakawa Chemical Industries, Ltd.) as a tackifier was added to 100 parts on a solid basis of this dispersion. Thus, an aqueous dispersion type pressure-sensitive adhesive was obtained.

This pressure-sensitive adhesive was applied to the heavy-releasing side of a release liner coated with a silicone release agent (the release liner was "SLB-80W5D" manufactured by Kaito Chemical Industry Co., Ltd.). The coating was dried at 120° C. for 3 minutes to form a pressure-sensitive adhesive layer having a thickness of 70 $\mu$m to produce a pressure-sensitive adhesive sheet. This pressure-sensitive adhesive sheet was applied to each side of a nonwoven fabric (PR-14, manufactured by Japan Paperboard Industries Co., Ltd.). Thus, a pressure-sensitive adhesive sheet was produced.

EXAMPLE 2

A pressure-sensitive adhesive sheet was produced in the same manner as in Example 1, except that 30 parts on a solid basis of an aqueous dispersion of a rosin-phenol resin ("Sumilite Resin PR12603" manufactured by Sumitomo Durez Co., Ltd.) was added as a tackifier in place of the rosin-phenol resin used in Example 1 ("Tamanol E-100" manufactured by Arakawa Chemical Industries, Ltd.).

EXAMPLE 3

A pressure-sensitive adhesive sheet was produced in the same manner as in Example 1, except that 30 parts on a solid basis of an aqueous dispersion of a terpene-phenol resin ("Nanolet G1450" manufactured by Yasuhara Chemical Co., Ltd.) was added as a tackifier in place of the rosin-phenol resin used in Example 1 ("Tamanol E-100" manufactured by Arakawa Chemical Industries, Ltd.).

COMPARATIVE EXAMPLE 1

A pressure-sensitive adhesive sheet was produced in the same manner as in Example 1, except that 30 parts on a solid basis of a polymerized rosin ester resin ("Super Ester E-625" manufactured by Arakawa Chemical Industries, Ltd.) was added as a tackifier in place of the rosin-phenol resin used in Example 1 ("Tamanol E-100" manufactured by Arakawa Chemical Industries, Ltd.).

COMPARATIVE EXAMPLE 2

A pressure-sensitive adhesive sheet was produced in the same manner as in Example 1, except that no tackifier was added.

COMPARATIVE EXAMPLE 3

A reactor equipped with a condenser tube, nitrogen introduction tube, thermometer, and stirrer was used to conduct polymerization in the following manner. 70 parts of butyl acrylate, 30 parts of 2-ethylhexyl acrylate, 3 parts of acrylic acid, 0.07 parts of dodecanethiol (chain transfer agent), and 0.1 part of 2,2'-azobis[2-(5-methyl-2-imidazolin-2-yl)propane] dihydrochloride (initiator) were added to 100 parts of water containing 1.5 parts of sodium polyoxyethylene nonylphenyl ether sulfate (emulsifying agent). The resulting mixture was emulsion-polymerized to obtain a polymer.

10% ammonia water was added to the polymer emulsion obtained above to adjust the pH of the emulsion to 8. 30 parts on a solid basis of a rosin-phenol resin ("Tamanol E-100" manufactured by Arakawa Chemical Industries, Ltd.) as a tackifier was added to 100 parts on a solid basis of this emulsion. 0.14 parts of a water-soluble epoxy crosslinking agent (TEPIC, manufactured by Mitsubishi Gas Chemical Co., Inc.) was added thereto. Thus, an aqueous dispersion type pressure-sensitive adhesive was obtained.

This pressure-sensitive adhesive was used to produce a pressure-sensitive adhesive sheet in the same manner as in Example 1.

Figure 8:
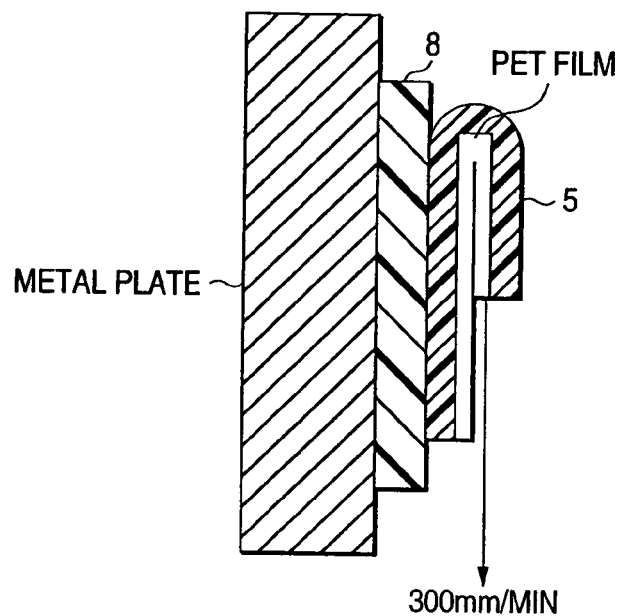
FIG. 8 is a view diagrammatically illustrating the method of measuring adhesive force in application to a rubber foam in the Examples according to the invention.

The pressure-sensitive adhesive sheets obtained in the Examples and Comparative Examples given above were examined for the following properties. The results obtained are shown in the Table below. Adhesive Force in Application to Rubber Foam:

A 40 μm-thick PET film was applied to one side of the pressure-sensitive adhesive sheet obtained in each of the Examples and Comparative Examples. This laminate was cut into a size having a width of 20 mm and a length of 100 mm to produce a test piece for evaluation. This test piece was press-bonded to an adherend obtained by bonding to a metal plate an EPDM rubber foam containing a paraffinic oil and asphalt as plasticizers. This press bonding was accomplished by pressing the test piece against the rubber foam by rolling a 2-kg roller forward and backward once on the test piece. The test piece applied was allowed to stand at 23° C. for 30 minutes and then peeled off to measure the force required for the peeling. This measurement was made with universal tensile tester "TCM-1kNB" manufactured by Minebea Co., Ltd. under the conditions of 180° peel and a peel rate of 300 mm/min in an atmosphere of 23° C. and 60% RH (see FIG. 8).

Figure 9:
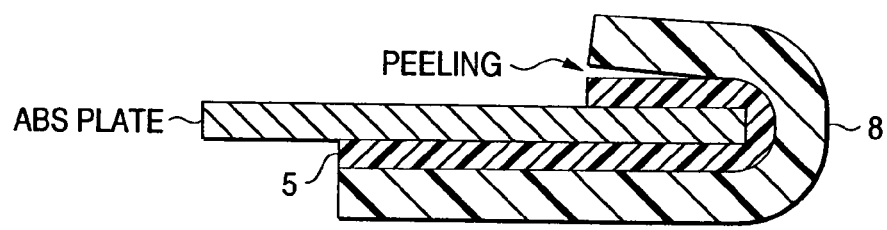
FIG. 9 is a view diagrammatically illustrating the method of examination used in an edge peeling test in the Examples according to the invention.

Edge Peeling Test:

The pressure-sensitive adhesive sheet produced in each of the Examples and Comparative Examples was applied to an EPDM rubber foam (thickness, 5 mm) containing a paraffinic oil and asphalt as plasticizers. This laminate was cut into a size having a width of 10 mm and a length of 50 mm to produce a test piece for evaluation. One end of this test piece was applied to an end part of an ABS plate so as to result in a contact area of 10 mm×10 mm (front side). Thereafter, the remaining part (10 mm (width)×40 mm) was folded back and applied to the back side of the ABS plate. This sample was allowed to stand in a 70° C. atmosphere for 2 hours and then examined as to whether the rubber foam located on the front side had peeled off the ABS plate (see FIG. 9).

Figure 10:
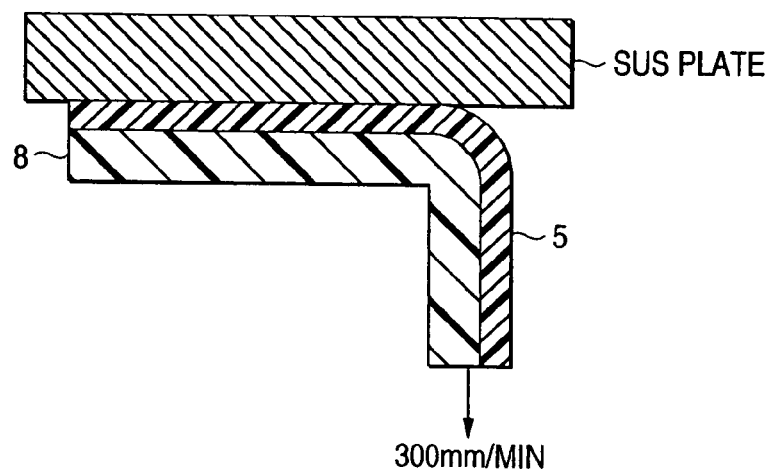
FIG. 10 is a view diagrammatically illustrating the method of measuring the adhesive force of a pressure-sensitive adhesive rubber foam sheet in the Examples according to the invention.

Adhesive Force of Pressure-Sensitive Adhesive Rubber Foam Sheet:

The pressure-sensitive adhesive sheet produced in each of the Examples and Comparative Examples was applied to an EPDM rubber foam (thickness, 5 mm) containing a paraffinic oil and asphalt as plasticizers. This laminate was cut into a size having a width of 20 mm and a length of 100 mm to produce a test piece for evaluation. This test piece was press-bonded to an SUS plate as an adherend by pressing the test piece against the adherend by rolling a 2-kg roller forward and backward once on the test piece. The test piece applied was peeled off after standing at 23° C. for 30 minutes (initial value) and after standing in a 60° C./90% RH atmosphere for 7 days (after storage) to measure the forces required for the peeling. This measurement was made with universal tensile tester "TCM-1kNB" manufactured by Minebea Co., Ltd. under the conditions of 90° peel and a peel rate of 300 mm/min in an atmosphere of 23° C. and 60% RH (see FIG. 10).

TABLE

| | Pressure-sensitive adhesive composition | | Adhesive force | Unsusceptibility | Adhesive force on SUS plate | |
|---|---|---|---|---|---|---|
| | Crosslinking method | Tackifier resin | on rubber foam [N/20 mm] | to edge peeling of rubber foam | Initial [N/20 mm] | After storage [N/20 mm] |
| Example 1 | Silanol | Rosin-phenol | 7 | ○ | 12 | 12 |
| Example 2 | | Rosin-phenol | 6 | ○ | 12 | 12 |
| Example 3 | | Terpene-phenol | 5 | ○ | 10 | 10 |
| Comparative Example 1 | Silanol | Polymerized rosin ester | 8 | ○ | 12 | 6 |
| Comparative Example 2 | | None | 1 | X | 5 | 5 |
| Comparative Example 3 | Epoxy | Rosin-phenol | 5 | X | 10 | 10 |

As apparent from the above Table, the aqueous dispersion type pressure-sensitive adhesives according to the invention (Examples 1 to 3) showed satisfactory performances in all of adhesive force in application to a rubber foam, unsusceptibility to edge peeling, and adhesive force after storage.

In contrast, the pressure-sensitive adhesive of Comparative Example 1, which employed as a tackifier a polymerized rosin ester having no phenolic skeleton, showed poor adhesive force after storage, although it showed satisfactory performances in adhesive force in application to the rubber foam and unsusceptibility to edge peeling. The pressure-sensitive adhesive of Comparative Example 2, to which no tackifier had been added, was inferior in adhesive force in application to the rubber foam and unsusceptibility to edge peeling. Furthermore, the aqueous dispersion type pressure-sensitive adhesive for which no silane monomer had been copolymerized and which had been crosslinked with an epoxy crosslinking agent (Comparative Example 3) had poor unsusceptibility to edge peeling.

As described above, the aqueous dispersion type pressure-sensitive adhesive composition of the invention is desirable from the standpoint of environmental health because it is based on an aqueous dispersion type acrylic pressure-sensitive adhesive. The pressure-sensitive adhesive sheet, which comprises a substrate and a pressure-sensitive adhesive layer formed from the composition, and the pressure-sensitive adhesive rubber foam sheet are excellent in adhesion to rubber foams and unsusceptibility to edge peeling and exhibit such pressure-sensitive adhesive properties that they retain stable adhesive force over a long period of time.

It should further be apparent to those skilled in the art that various changes in form and detail of the invention as shown and described above may be made. It is intended that such changes be included within the spirit and scope of the claims appended hereto.

This application is based on Japanese Patent Application No. 2001-378090 filed Dec. 12, 2001, the disclosure of which is incorporated herein by reference in its entirety.

What is claimed is:

1. A pressure-sensitive adhesive composition comprising an aqueous dispersion of a polymer obtained by copolymerizing 100 parts by weight of a monomer mixture comprising one or more alkyl (meth)acrylates as the main component and 0.005 to 1 part by weight of at least one silane monomer, and a phenolic tackifier selected from the group consisting of rosin-phenol resins, terpene-phenol resins, and alkylphenol resins, added to the aqueous dispersion, and further comprising an organic compound capable of bonding to the silane monomer in an amount of from 0.005 to 1 part by weight per 100 parts by weight of the polymer.

2. The composition as claimed in claim 1, wherein the polymer is obtained by copolymerizing 100 parts by weight of a monomer mixture comprising one or more alkyl (meth)acrylates as the main component, and from 0.005 to 1 part by weight of at least one silane monomer, to yield a resin composition having a solvent insoluble content of 5% or lower.

3. The composition as claimed in claim 1, wherein the organic compound is a silane compound.

4. The composition as claimed in claim 1, wherein the silane monomer is a methoxysilane monomer.

5. The composition as claimed in claim 1, wherein the polymer has units of methacrylic acid copolymerized.

6. The composition as claimed in claim 1, wherein the tackifier is a rosin-phenol or terpene-phenol tackifier.

7. A pressure-sensitive adhesive sheet comprising a substrate and, disposed on one or both sides thereof, a pressure-sensitive adhesive layer comprising the aqueous dispersion pressure-sensitive adhesive composition as claimed in claim 1.

8. A pressure-sensitive adhesive rubber foam sheet comprising a rubber foam and, disposed on one or both sides thereof, a pressure-sensitive adhesive layer comprising an aqueous dispersion pressure-sensitive adhesive composition comprising an aqueous dispersion of a polymer obtained by copolymerizing a monomer mixture comprising one or more alkyl (meth)acrylates as the main component and at least one silane monomer, and a phenolic tackifier selected from the group consisting of rosin-phenol resins, terpene-phenol resins, and alkylphenol resins, added to the aqueous dispersion, and further comprising an organic compound capable of bonding to the silane monomer in an amount of from 0.005 to 1 part by weight per 100 parts by weight of the polymer.

9. A pressure-sensitive adhesive rubber foam sheet comprising a rubber foam and, disposed on one or both sides thereof, a pressure-sensitive adhesive sheet comprising a substrate and, disposed on one or both sides thereof, a pressure-sensitive adhesive composition comprising an aqueous dispersion of a polymer obtained by copolymerizing a monomer mixture comprising one or more alkyl (meth)acrylates as the main component and at least one silane monomer, and a phenolic tackifier selected from the group consisting of rosin-phenol resins, terpene-phenol resins, and alkylphenol resins, added to the aqueous dispersion, and further comprising an organic compound capable of bonding to the silane monomer in an amount of from 0.005 to 1 part by weight per 100 parts by weight of the polymer.

* * * * *